United States Patent
Yang et al.

(10) Patent No.: US 10,257,770 B2
(45) Date of Patent: Apr. 9, 2019

(54) PEDESTRIAN DETECTION

(71) Applicants: Zeng Yang, Shanghai (CN); Qingshan Zhang, Shanghai (CN); Guoxia Zhang, Shanghai (CN)

(72) Inventors: Zeng Yang, Shanghai (CN); Qingshan Zhang, Shanghai (CN); Guoxia Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 124 days.

(21) Appl. No.: 15/300,232

(22) PCT Filed: Apr. 28, 2014

(86) PCT No.: PCT/CN2014/076355
§ 371 (c)(1),
(2) Date: Sep. 28, 2016

(87) PCT Pub. No.: WO2015/165002
PCT Pub. Date: Nov. 5, 2015

(65) Prior Publication Data
US 2017/0150423 A1 May 25, 2017

(51) Int. Cl.
*H04W 48/10* (2009.01)
*G08G 1/0967* (2006.01)
(Continued)

(52) U.S. Cl.
CPC ............ *H04W 48/10* (2013.01); *G08G 1/005* (2013.01); *G08G 1/0112* (2013.01);
(Continued)

(58) Field of Classification Search
CPC .... G08G 1/005; G08G 1/0112; G08G 1/0141; G08G 1/096708; G08G 1/09675;
(Continued)

(56) References Cited

U.S. PATENT DOCUMENTS 8,253,589 B2 * 8/2012 Grimm ................. G01S 5/0072
340/539.1
9,559,433 B2 * 1/2017 Zhou ....................... H01Q 5/35
(Continued)

FOREIGN PATENT DOCUMENTS

CN          101398976 A     4/2009
CN          101668349 A     3/2010
(Continued)

OTHER PUBLICATIONS

Sugimoto et al. "Prototype of pedestrian-to-vehicle communication system for the prevention of pedestrian accidents using both 3G wireless and WLAN communication", May 2008, IEEE, Proc. Int. Symp. Wireless Pervasive Computing, pp. 764-767 (Year: 2008).*
(Continued)

*Primary Examiner* — Un C Cho
*Assistant Examiner* — Shah M Rahman
(74) *Attorney, Agent, or Firm* — McCoy Russell LLP

(57) ABSTRACT

Wi-Fi based position information communicating methods, vehicle mounted communication devices, and pedestrian devices are provided. One of the methods includes: a communication device mounted on a first vehicle determining whether position information of a second vehicle, whose distance to the first vehicle is shorter than a first predetermined distance, is received within a first predefined time period; and if no, broadcasting position information of the first vehicle in a first 802.11 management frame. By employing the methods, pedestrian detection rate may be improved and wireless channel congestion may be mitigated.

15 Claims, 5 Drawing Sheets

(51) Int. Cl.
*G08G 1/005* (2006.01)
*G08G 1/01* (2006.01)
*H04W 4/04* (2009.01)
*H04W 28/02* (2009.01)
*H04W 4/02* (2018.01)
*H04W 4/46* (2018.01)
*H04W 84/12* (2009.01)
*H04W 84/18* (2009.01)

(52) U.S. Cl.
CPC ... *G08G 1/09675* (2013.01); *G08G 1/096716* (2013.01); *G08G 1/096791* (2013.01); *H04W 4/027* (2013.01); *H04W 4/046* (2013.01); *H04W 4/46* (2018.02); *H04W 28/0289* (2013.01); *G08G 1/096783* (2013.01); *H04W 84/12* (2013.01); *H04W 84/18* (2013.01)

(58) Field of Classification Search
CPC ....... G08G 1/096791; G08G 1/096716; G08G 1/096783; G08G 1/116; H04W 28/0289; H04W 48/10; H04W 4/046; H04W 84/12; H04W 84/005; H04W 4/027; H04W 4/46; H04W 84/18
See application file for complete search history.

(56) References Cited

U.S. PATENT DOCUMENTS

| | | | | |
|---|---|---|---|---|
| 9,786,178 | B1* | 10/2017 | Bai | ............... G08G 1/166 |
| 2009/0122738 | A1 | 5/2009 | Chen et al. | |
| 2010/0060480 | A1 | 3/2010 | Bai et al. | |
| 2010/0182982 | A1 | 7/2010 | Yim et al. | |
| 2011/0090093 | A1 | 4/2011 | Grimm et al. | |
| 2012/0108163 | A1* | 5/2012 | Bai | ............... H04L 12/1854 455/3.06 |
| 2012/0317161 | A1* | 12/2012 | Bai | ............... G06F 17/30029 709/201 |
| 2013/0322368 | A1* | 12/2013 | Nagai | ............... H04W 74/0808 370/329 |
| 2014/0191882 | A1* | 7/2014 | Varma | ............... G08G 1/096783 340/905 |
| 2014/0191884 | A1* | 7/2014 | Maeda | ............... G08G 1/163 340/944 |
| 2015/0035685 | A1* | 2/2015 | Strickland | ............... B60Q 9/008 340/901 |
| 2015/0153184 | A1* | 6/2015 | Mudalige | ............... G01C 21/26 701/523 |
| 2017/0316691 | A1* | 11/2017 | Miller | ............... B60W 40/114 |

FOREIGN PATENT DOCUMENTS

| | | | | |
|---|---|---|---|---|
| CN | 102044145 | A | 5/2011 | |
| CN | 102291670 | A | 12/2011 | |
| CN | 103544838 | A | 1/2014 | |
| EP | 2101305 | A2 * | 9/2009 | ............. G08G 1/161 |
| JP | 2004220143 | A | 8/2004 | |
| JP | 2009123249 | A * | 6/2009 | ............. H04W 84/18 |
| JP | WO 2011089641 | A1 * | 7/2011 | ............. G08G 1/162 |
| JP | WO 2013069278 | A1 * | 5/2013 | ............. H04W 4/027 |
| KR | 101354049 | B1 * | 2/2014 | ............. G08G 1/0968 |
| WO | 2014046575 | A1 | 3/2014 | |
| WO | 2014058263 | A1 | 4/2014 | |

OTHER PUBLICATIONS

Liebner et al., "Active Safety for Vulnerable Road Users based on Smartphone Position Data," 2013, IEEE, Intelligent Vehicles Symposium, pp. 256-261 (Year: 2013).*

Wedel et al., "V2X-Based Traffic Congestion Recognition and Avoidance", 2009, IEEE, Proc. 10th ISPAN, pp. 637-641 (Year: 2009).*

European Patent Office, Extended European Search Report Issued in Application No. 14891057.3, dated Feb. 6, 2018, Germany, 8 pages.

ISA State Intellectual Property Office of the People's Republic of China, International Search Report and Written Opinion Issued in Application No. PCT/CN2014/076355, dated Jan. 28, 2015, WIPO, 12 pages.

State Intellectual Property Office of the People's Republic of China, Office Action and Search Report Issued in Application No. 201480076930.3, dated Oct. 22, 2018, 10 pages.(Submitted with Partial Translation).

* cited by examiner

PEDESTRIAN DETECTION

CROSS REFERENCE TO RELATED APPLICATIONS

The present application is a U.S. National Phase of International Patent Application Serial No. PCT/CN2014/076355, entitled "PEDESTRIAN DETECTION" filed on Apr. 28, 2014, the entire contents of which are hereby incorporated by reference for all purposes.

TECHNICAL FIELD

The present disclosure generally relates to pedestrian detection.

BACKGROUND

Nowadays, pedestrian detection methods have emerged in driving assistance systems to improve driving safety. In some solutions, to detect pedestrians, vehicles obtain position information of pedestrians through Wi-Fi Direct. In the Wi-Fi Direct method, to obtain position information of a pedestrian, an electronic device mounted on a vehicle needs to establish Wi-Fi connection with an electronic device carried by the pedestrian. If all the electronic devices carried by the pedestrians send their position information to the vehicles, a wireless communication channel may be congested. Therefore, there is a need for new pedestrian detection methods to improve detection rate and mitigate wireless channel congestion.

SUMMARY

In one embodiment, a Wi-Fi based position information communicating method is provided. The method includes: a communication device mounted on a first vehicle determining whether position information of a second vehicle, whose distance to the first vehicle is shorter than a first predetermined distance, is received within a first predefined time period; and if no, broadcasting position information of the first vehicle in a first 802.11 management frame.

In some embodiments, the above method may be performed repeatedly.

In some embodiments, the position information communicating method may further include: after receiving position information of a first pedestrian device from the first pedestrian device, broadcasting the position information of the first pedestrian device in a second 802.11 management frame.

In some embodiments, the position information communicating method may further include: after receiving the position information of the first pedestrian device from the first pedestrian device, defining a second time period; determining whether position information of a second pedestrian device is received from other vehicles in the second time period, where the distance between the second pedestrian device and the first pedestrian device is shorter than a second predetermined distance; and if no, broadcasting the position information of the first pedestrian device in the second 802.11 management frame.

In some embodiments, the first 802.11 management frame or the second 802.11 management frame may be a beacon frame. In some embodiments, the position information of the first vehicle may be carried in a Basic Service Set Identifier (BSSID) field or a Service Set Identifier (SSID) field in a beacon frame. In some embodiments, the received position information of the first pedestrian device may be carried in a BSSID field or a SSID field in a beacon frame.

In some embodiments, the first 802.11 management frame or the second 802.11 management frame may be other types of frames, such as a probe response frame, an authentication response frame and an association response frame.

In some embodiments, the first or second predetermined distance may be twenty meters.

In some embodiments, the position information of the first vehicle may be obtained from a positioning device, such as a global positioning system (GPS) device, mounted on the first vehicle.

In some embodiments, the position information communicating method may further include: after receiving the position information of one of the first and second pedestrian devices, calculating the distance between the one of the first and second pedestrian devices and the first vehicle based on the position information of the one of the first and second pedestrian devices and the first vehicle; and generating an alarm if the calculated distance is shorter than a predetermined distance.

In some embodiments, the predetermined distance may be ten meters.

In one embodiment, a Wi-Fi based position information communicating method is provided. The method includes: after receiving position information of a first pedestrian device from the first pedestrian device, a communication device mounted on a first vehicle broadcasting the position information of the first pedestrian device in a first 802.11 management frame.

In some embodiments, the position information communicating method may further include: after receiving the position information of the first pedestrian device from the first pedestrian device, defining a first time period; determining whether position information of a second pedestrian device is received from other vehicles in the first time period, where the distance between the second pedestrian device and the first pedestrian device is shorter than a first predetermined distance; and if no, broadcasting the position information of the first pedestrian device in the first 802.11 management frame.

In some embodiments, the position information communicating method may further include: determining whether position information of a second vehicle, whose distance to the first vehicle is shorter than a second predetermined distance, is received within a second predefined time period; and if no, broadcasting position information of the first vehicle in a second 802.11 management frame.

In some embodiments, the first 802.11 management frame or the second 802.11 management frame may be a beacon frame. In some embodiments, the received position information of the first pedestrian device may be carried in a BSSID field or a SSID field of a beacon frame. In some embodiments, the position information of the first vehicle may be carried in a BSSID field or a SSID field of a beacon frame.

In some embodiments, the first 802.11 management frame or the second 802.11 management frame may be other types of frames, such as a probe response frame, an authentication response frame and an association response frame.

In some embodiments, the first or second predetermined distance may be twenty meters.

In some embodiments, the position information of the first vehicle may be obtained from a positioning device, such as a GPS device, mounted on the first vehicle.

In some embodiments, the position information communicating method may further include: after receiving the position information of one of the first and second pedestrian devices, calculating the distance between the one of the first and second pedestrian devices and the first vehicle based on the position information of the one of the first and second pedestrian devices and the first vehicle; and generating an alarm if the calculated distance is shorter than a predetermined distance.

In some embodiments, the predetermined distance may be ten meters.

In one embodiment, a Wi-Fi based position information communicating method is provided. The method may include: a first pedestrian device broadcasting its position information in a 802.11 management frame.

In some embodiments, the position information communicating method may further include: determining whether position information of a second pedestrian device, whose distance to the first pedestrian device is shorter than a predetermined distance, is received from a first vehicle; and if no, broadcasting the position information of the first pedestrian device in the 802.11 management frame.

In some embodiments, the first pedestrian device may broadcast the position information of the first pedestrian device periodically or after receiving position information of a second vehicle.

In some embodiments, the 802.11 management frame may be a probe request frame. The position information of the first pedestrian device may be carried in a SSID field or a BSSID field of the probe request frame.

In some embodiments, the 802.11 management frame may be other types of frames, such as an authentication request frame and an association request frame.

In some embodiments, the predetermined distance may be twenty meters.

In some embodiments, the position information of the first pedestrian device may be obtained from a positioning device, such as a GPS device, mounted on the first pedestrian device.

In one embodiment, a communication system mounted on a first vehicle is provided. The communication system may include a receiver, a transmitter and a processing device configured to: determine whether position information of a second vehicle, whose distance to the first vehicle is shorter than a first predetermined distance, is received by the receiver within a first predefined time period; and if no, control the transmitter to broadcast position information of the first vehicle in a first 802.11 management frame.

In some embodiments, the processing device may be further configured to repeat the above processes.

In some embodiments, the processing device may be further configured to: after position information of a first pedestrian device is received from the first pedestrian device by the receiver, control the transmitter to broadcast the position information of the first pedestrian device in a second 802.11 management frame.

In some embodiments, the processing device may be further configured to: after the position information of the first pedestrian device is received from the first pedestrian device by the receiver, define a second time period; determine whether position information of a second pedestrian device is received from other vehicles by the receiver in the second time period, where the distance between the second pedestrian device and the first pedestrian device is shorter than a second predetermined distance; and if no, control the transmitter to broadcast the position information of the first pedestrian device in the second 802.11 management frame.

In some embodiments, the first 802.11 management frame or the second 802.11 management frame may be a beacon frame. In some embodiments, the processing device may be further configured to add the position information of the first vehicle into a BSSID field or a SSID field of a beacon frame. In some embodiments, the processing device may be further configured to add the position information of the first pedestrian device into a BSSID field or a SSID field of a beacon frame.

In some embodiments, the first 802.11 management frame or the second 802.11 management frame may be other types of frames, such as a probe response frame, an authentication response frame and an association response frame.

In some embodiments, the first or second predetermined distance may be twenty meters.

In some embodiments, the communication device may further include an output device. The processing device may be further configured to: after the position information of one of the first and second pedestrian devices is received by the receiver, calculate the distance between the one of the first and second pedestrian devices and the first vehicle based on the position information of the one of the first and second pedestrian devices and the first vehicle; and control the output device to generate an alarm if the calculated distance is shorter than a predetermined distance.

In some embodiments, the predetermined distance may be ten meters.

In some embodiments, the communication system may further include a positioning device, such as a GPS device, configured to obtain the position information of the first vehicle.

In one embodiment, a communication system mounted on a first vehicle is provided. The communication system may include a receiver, a transmitter and a processing device configured to: after position information of a first pedestrian device is received from the first pedestrian device by the receiver, control the transmitter to broadcast the position information of the first pedestrian device in a first 802.11 management frame.

In some embodiments, the processing device may be further configured to: after the position information of the first pedestrian device is received from the first pedestrian device by the receiver, define a first time period; determine whether position information of a second pedestrian device is received from other vehicles by the receiver in the first time period, where the distance between the second pedestrian device and the first pedestrian device is shorter than a first predetermined distance; and if no, control the transmitter to broadcast the position information of the first pedestrian device in the first 802.11 management frame.

In some embodiments, the processing device may be further configured to: determine whether position information of a second vehicle, whose distance to the first vehicle is shorter than a second predetermined distance, is received by the receiver within a second predefined time period; and if no, control the transmitter to broadcast position information of the first vehicle in a second 802.11 management frame.

In some embodiments, the first 802.11 management frame or the second 802.11 management frame may be a beacon frame. In some embodiments, the processing device may be further configured to add the position information of the first pedestrian device into a BSSID field or a SSID field of a beacon frame. In some embodiments, the processing device may be further configured to add the position information of the first vehicle into a BSSID field or a SSID field of a beacon frame.

In some embodiments, the first 802.11 management frame or the second 802.11 management frame may be other types of frames, such as a probe response frame, an authentication response frame and an association response frame.

In some embodiments, the first or second predetermined distance may be twenty meters.

In some embodiments, the communication device may further include an output device. The processing device may be further configured to: after the position information of one of the first and second pedestrian devices is received by the receiver, calculate the distance between the one of the first and second pedestrian devices and the first vehicle based on the position information of the one of the first and second pedestrian devices and the first vehicle; and control the output device to generate an alarm if the calculated distance is shorter than a predetermined distance.

In some embodiments, the predetermined distance may be ten meters.

In some embodiments, the communication system may further include a positioning device, such as a GPS device, configured to obtain the position information of the first vehicle.

In one embodiment, a first pedestrian device is provided. The first pedestrian device may include a receiver, a transmitter and a processing device configured to: control the transmitter to broadcast position information of the first pedestrian device in a 802.11 management frame.

In some embodiments, the processing device may be further configured to: determine whether position information of a second pedestrian device, whose distance to the first pedestrian device is shorter than a predetermined distance, is received from a first vehicle; and if no, control the transmitter to broadcast the position information of the first pedestrian device in the 802.11 management frame.

In some embodiments, the processing device may be configured to control the transmitter to broadcast the position information of the first pedestrian device periodically or after position information of a second vehicle is received by the receiver.

In some embodiments, the 802.11 management frame may be a probe request frame. In some embodiments, the processing device may be further configured to add the position information of the first pedestrian device into a SSID field or a BSSID field of the probe request frame.

In some embodiments, the 802.11 management frame may be other types of frames, such as an authentication request frame and an association request frame.

In some embodiments, the predetermined distance may be twenty meters.

In some embodiments, the first pedestrian device may further include a positioning device, configured to obtain the position information of the first pedestrian device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
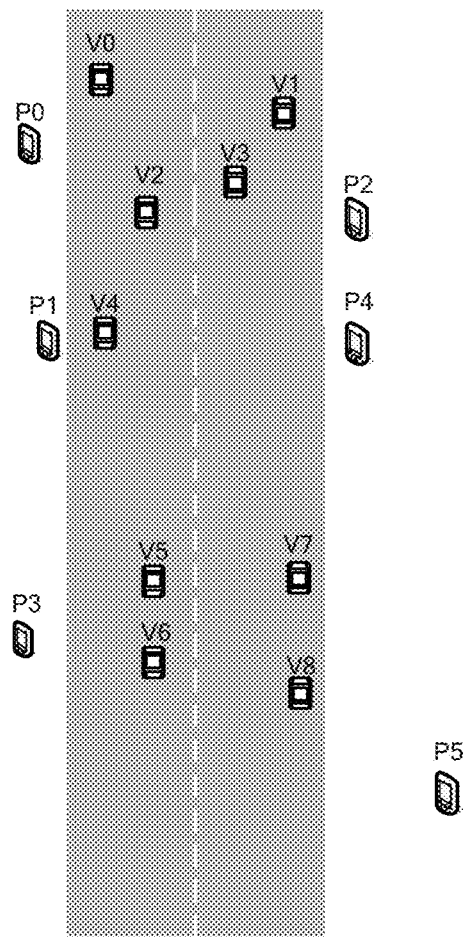
FIG. 1 is a schematic diagram of a driving scenario on a road.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

To improve driving safety, it is necessary for vehicles to obtain position information of pedestrians during driving.

FIG. 1 is a schematic diagram of a driving scenario on a road.

Referring to FIG. 1, vehicles V0 to V8 are driving on the road and pedestrian devices P0 to P5 exist on two sides of the road. In some embodiments, each pedestrian device may be carried by a walker or a bicyclist.

Assuming each of the vehicles V0 to V8 and the pedestrian devices P0 to P5 is equipped with a wireless transmission and reception device, the vehicles and the pedestrian devices may transmit their position information in frames. In some embodiments, each of the vehicles V0 to V8 and the pedestrian devices P0 to P5 may be equipped with a positioning device, such as a GPS device, to obtain the position information. Wi-Fi service may be provided on the vehicles V0 to V8 and the pedestrian devices P0 to P5, and they may turn on Wi-Fi to receive and send frames.

Figure 2:
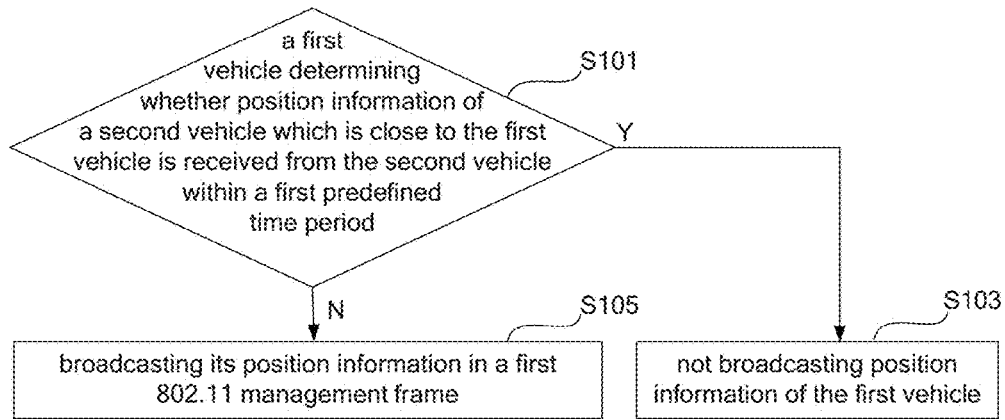
FIG. 2 is a flow chart of a Wi-Fi based position information communicating method 100 according to one embodiment.

FIG. 2 is a flow chart of a Wi-Fi based position information communicating method 100 according to one embodiment.

Referring to FIG. 2, in S101, a first vehicle determining whether position information of a second vehicle which is close to the first vehicle is received from the second vehicle within a first predefined time period.

In some embodiments, the position information of the second vehicle may be carried in a 802.11 management frame. In some embodiments, the position information may be represented by GPS coordinates. In some embodiments, the first predefined time period may be three seconds.

In some embodiments, whether the second vehicle is close to the first vehicle is determined based on position information of the first and second vehicles. In some embodiments, the position information of the first vehicle may be obtained from a GPS device mounted on the first vehicle. In some embodiments, if the distance between the first and second vehicles is shorter than a predetermined distance, such as twenty meters, the first vehicle may determine that the second vehicle is close to itself.

Referring to FIG. 1, hereinafter, the vehicle V0 is taken as the first vehicle for illustration. In the first predefined time period, the vehicle V0 may receive a 802.11 management frame including position information of the vehicle V1 from the vehicle V1 and determine whether the vehicle V1 is close to the vehicle V0. For example, if the distance between the vehicles V0 and V1 calculated by the vehicle V0 is ten meters which is shorter than the predetermined distance, such as twenty meters, the method 100 may proceed to S103, not broadcasting position information of the first vehicle. If the distance between the vehicles V0 and V1 is longer than the predetermined distance, the method 100 may proceed to S105.

In S105, the first vehicle broadcasting its position information in a first 802.11 management frame.

In some embodiments, the first 802.11 management frame may be a beacon frame. In some embodiments, the first vehicle may add its position information, such as GPS coordinates, into a BSSID field of the beacon frame. And a SSID field of the beacon frame may include a sequence of bit which represents an application name. For example, a sequence of bit "010" may be carried in the SSID field of the beacon frame to represent "pedestrian detection" application. In practice, the first vehicle may receive various frames and only part of the various frames may be 802.11 management frames related to the "pedestrian detection" application. The first vehicle may identify the related 802.11 management frames based on the sequence of bit representing the "pedestrian detection" application which is carried in the related 802.11 management frames. In some embodiments, the first vehicle may add its identifier (ID) into the first 802.11 management frame.

In some embodiments, the first vehicle may add its position information into the SSID field of the beacon frame. In some embodiments, the first 802.11 management frame may be other types of frames, such as a probe response frame, an authentication response frame and an association response frame.

In some embodiments, if no position information of other vehicles is received in the first predefined time period, the first vehicle may broadcast its position information in the first 802.11 management frame directly. For example, in the first predefined time period, the vehicle V0 may not receive position information from any other vehicles, thus, the vehicle V0 broadcasts its position information.

In some embodiments, S101 to S105 may be performed periodically.

From above, the first vehicle broadcasts its position information in the first 802.11 management frame based on determining whether position information of a vehicle which is close to the first vehicle is received. Therefore, channel congestion is mitigated.

Figure 3:
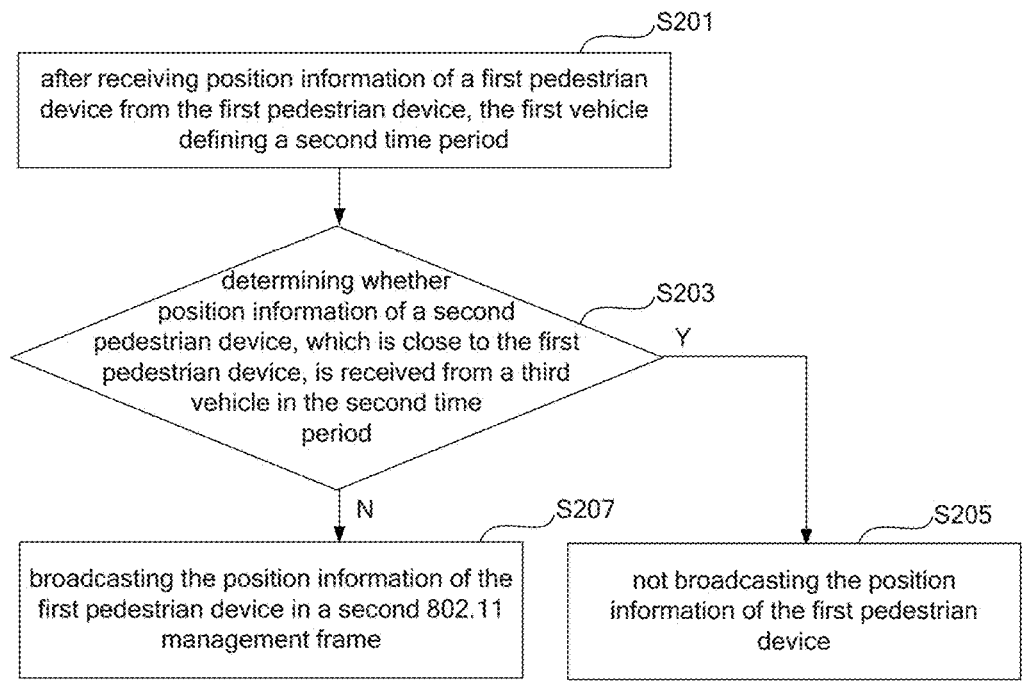
FIG. 3 is a flow chart of a Wi-Fi based position information communicating method 200 according to one embodiment.

FIG. 3 is a flow chart of a Wi-Fi based position information communicating method 200 according to one embodiment.

In S201, after receiving position information of a first pedestrian device from the first pedestrian device, the first vehicle defining a second time period.

In some embodiments, the position information of the first pedestrian device may be carried in a 802.11 management frame. In some embodiments, the 802.11 management frame may further include a sequence of bit representing the application name which is the same as that described in S105, so that the first vehicle can determine that the 802.11 management frame is related to the application and perform subsequent processes in the method 200.

In some embodiments, the second time period may be three seconds. In some embodiments, the first vehicle may determine whether the position information of the first pedestrian device is received from another vehicle or from the first pedestrian device based on a transmitter's ID contained in a frame which carries the position information of the first pedestrian device.

In S203, the first vehicle determining whether position information of a second pedestrian device, which is close to the first pedestrian device, is received from a third vehicle in the second time period.

In some embodiments, whether the second pedestrian device is close to the first pedestrian device is determined based on their position information. In some embodiments, if the distance between the first and second pedestrian devices is shorter than a predetermined distance, such as twenty meters, the first vehicle may determine that the two pedestrian devices are close to each other.

Referring to FIG. 1, for example, the vehicle V0 receives position information of the pedestrian device P0 from the pedestrian device P0 and starts to wait a second time period. If the vehicle V0 receives position information of the pedestrian device P1 from another vehicle, for example, the vehicle V4, in the second time period, the vehicle V0 calculates the distance between the pedestrian devices P0 and P1. If it is determined that the distance is shorter than a predetermined distance, such as twenty meters, the method 200 may proceed to S205, not broadcasting the position information of the first pedestrian device; else, proceed to S207.

In S207, the first vehicle broadcasting the position information of the first pedestrian device in a second 802.11 management frame.

In some embodiments, the second 802.11 management frame may be a beacon frame. In some embodiments, the first vehicle may add the received position information of the first pedestrian device, such as GPS coordinates, into a BSSID field of the beacon frame. And a SSID field of the beacon frame may include a sequence of bit representing the application name which is the same with the first 802.11 management frame. In some embodiments, the first vehicle may add its ID into the second 802.11 management frame.

In some embodiments, the first vehicle may add the received position information of the first pedestrian device into the SSID field of the beacon frame. In some embodiments, the second 802.11 management frame may be other types of frames, such as a probe response frame, an authentication response frame and an association response frame.

In some embodiments, if no position information of a second pedestrian device is received in the second time period, the first vehicle may broadcast the position information of the first pedestrian device in the second 802.11 management frame directly. For example, the vehicle V0 may not receive position information of pedestrian devices except for the pedestrian device P0 in the second time period, thus, the vehicle V0 broadcasts the position information of the pedestrian device P0.

In some embodiments, once receiving the position information of the first pedestrian device, the first vehicle may broadcast the received position information of the first pedestrian device directly.

From above, after receiving the position information from the first pedestrian device, the first vehicle may broadcast the position information of the first pedestrian device in the second 802.11 management frame based on determining whether position information of a second pedestrian device which is close to the first pedestrian device is received, which may mitigate channel congestion and avoid a broadcast storm.

In some embodiments, after obtaining the position information of one of the first and second pedestrian devices, the first vehicle may calculate the distance between the one of the first and second pedestrian devices and the first vehicle, and compare the distance with a predetermined distance. If the distance is shorter than the predetermined distance, the first vehicle may generate an alarm to mention a user. In some embodiments, the predetermined distance may be ten meters.

Figure 4:
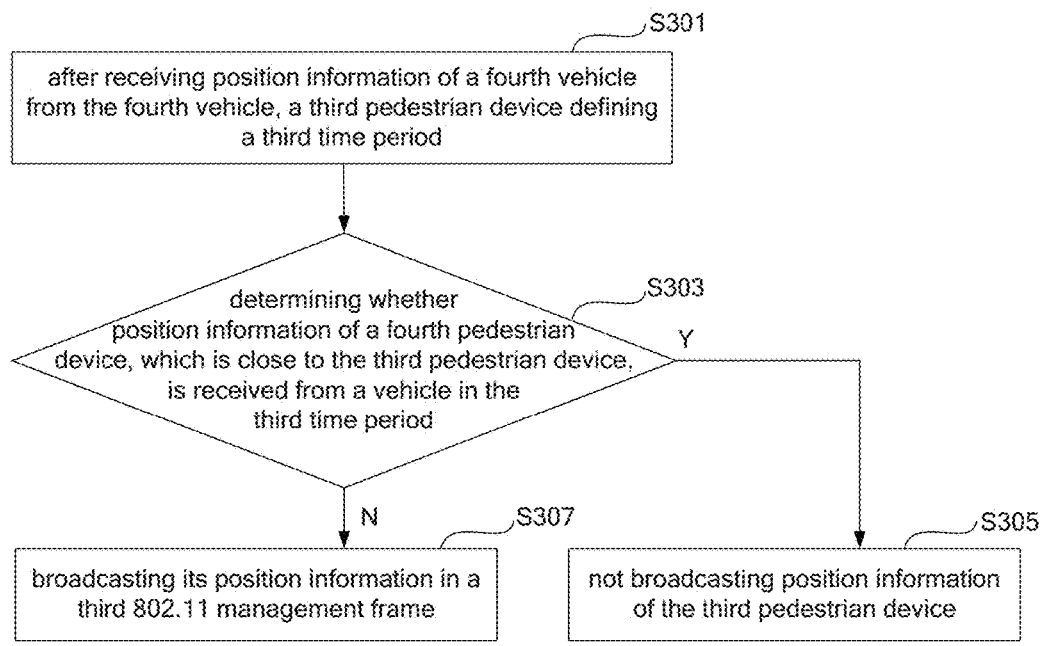
FIG. 4 is a flow chart of a Wi-Fi based position information communicating method 300 according to one embodiment.

FIG. 4 is a flow chart of a Wi-Fi based position information communicating method 300 according to one embodiment.

In S301, after receiving position information of a fourth vehicle from the fourth vehicle, a third pedestrian device defining a third time period.

In some embodiments, the third pedestrian device, such as a mobile phone, may be carried by a walker or a bicyclist. In some embodiments, the third time period may be three seconds.

In some embodiments, the position information of the fourth vehicle may be carried in a 802.11 management frame. In some embodiments, the 802.11 management frame may further include a sequence of bit representing the application name which is the same as that described in the method 200, so that the third pedestrian device can determine whether the 802.11 management frame is related to the application and perform subsequent processes in the method 300. In some embodiments, Wi-Fi service may be provided on the third pedestrian device and the third pedestrian device may turn on Wi-Fi to receive and send frames.

In S303, the third pedestrian device determining whether position information of a fourth pedestrian device, which is close to the third pedestrian device, is received from a vehicle in the third time period.

In some embodiments, the position information of the fourth pedestrian device may be carried in a 802.11 management frame. And the 802.11 management frame may further include a sequence of bit representing the application name which is the same as that described in S301.

In some embodiments, whether the fourth pedestrian device is close to the third pedestrian device is determined based on their position information. In some embodiments, the position information of the third pedestrian device may be obtained from a positioning device, such as a GPS module, mounted on the third pedestrian device. In some embodiments, if the distance between the third and fourth pedestrian devices is shorter than a predetermined distance, such as twenty meters, the third pedestrian device may determine that the two pedestrian devices are close to each other.

Referring to FIG. 1, for example, the pedestrian device P2 receives position information of the vehicle V3 from the vehicle V3 and starts to wait a third time period. If the pedestrian device P2 receives position information of the pedestrian device P4 from one of the vehicles V0 to V8 in the third time period, the pedestrian device P2 calculates the distance between the pedestrian devices P2 and P4. If it is determined that the distance is shorter than a predetermined distance, such as twenty meters, the method 300 may proceed to S305, not broadcasting position information of the third pedestrian device; else, proceed to S307.

In S307, the third pedestrian device broadcasting its position information in a third 802.11 management frame.

In some embodiments, the third 802.11 management frame may be a probe request frame. In some embodiments, the third pedestrian device may add its position information, such as GPS coordinates, into a SSID field of the probe request frame. And the SSID field of the probe request frame may further include a sequence of bit representing the application name which is the same as that described in above. In practice, the third pedestrian device may receive various frames and only part of the various frames may be 802.11 management frames related to the "pedestrian detection" application. The third pedestrian device may identify the related 802.11 management frames based on a sequence of bit representing the "pedestrian detection" application which is carried in the related 802.11 management frames. In some embodiments, the third pedestrian device may add its ID into the third 802.11 management frame.

In some embodiments, the third pedestrian device may add its position information into a BSSID field of the probe request frame. In some embodiments, the third 802.11 management frame may be other types of frame, such as an authentication request frame and an association request frame.

In some embodiments, if no position information of a fourth pedestrian device is received from a vehicle in the third time period, the third pedestrian device may broadcast its position information in the third 802.11 management frame directly. For example, the pedestrian device P2 may not receive position information of other pedestrian devices from the vehicles V0 to V8 in the third time period, thus, the pedestrian device P2 broadcasts its position information.

In some embodiments, the third pedestrian device may not broadcast its position information triggered by receiving the position information of the fourth vehicle. In some embodiments, the third pedestrian device may broadcast its position information periodically. That is, in each period, the third pedestrian device may determine whether position information of a fourth pedestrian device, which is close to the third pedestrian device, is received from a vehicle. If no, the third pedestrian device may broadcast its position information in a third 802.11 management frame; vice versa.

In some embodiments, the Wi-Fi based position information communicating method 300 may be performed when it is detected that the third pedestrian device is on a lane or approaching a lane. Referring to FIG. 1, the pedestrian device P5 may determine it is distant from the road and it is unnecessary to broadcast its position information.

From above, before broadcasting position information of the third pedestrian device, the third pedestrian device determines whether another pedestrian device which is close to the third pedestrian device has broadcasted its position information. If yes, the third pedestrian device may not broadcast the position information of the third pedestrian device, which may mitigate channel congestion and avoid a broadcast storm. It is well known in the art that, the 802.11 protocol stipulates a client cannot receive frames from other clients. Here, vehicles act as access points while pedestrian devices act as clients. Therefore, a pedestrian device cannot receive frames broadcasted by other pedestrian devices. In above embodiments, the third pedestrian device performs the determination process 303 based on received position information of pedestrian devices broadcasted by vehicles.

In the above Wi-Fi based position information communicating methods, 802.11 management frames are overloaded to carry position information of vehicles or pedestrian devices, so that the vehicles and pedestrian devices which have turned on Wi-Fi may realize to broadcast their position information, which ensures fast propagation of position information and further ensures driving safety. Furthermore, a part of vehicles and a part of pedestrian devices may not have to broadcast their position information, which may mitigate channel congestion and avoid a broadcast storm.

Figure 5:
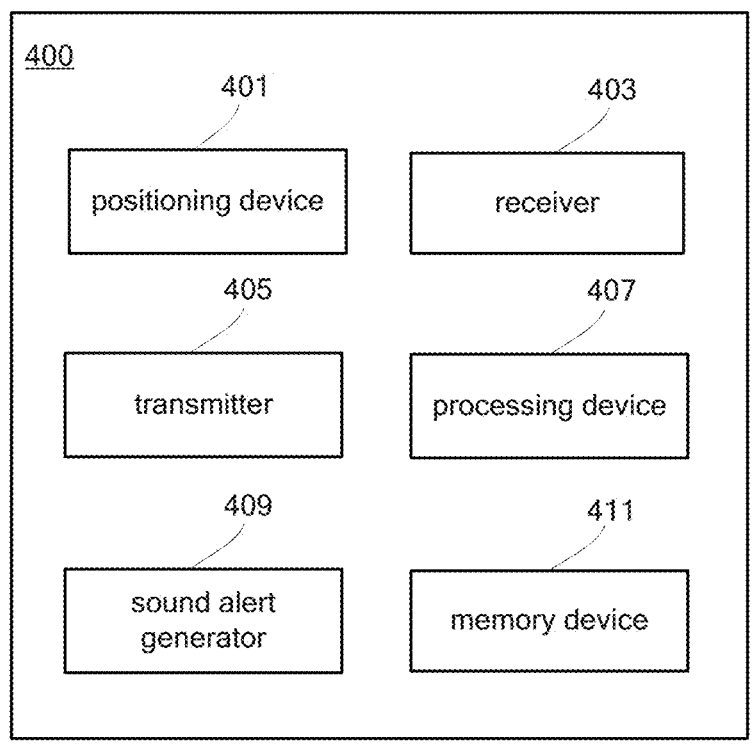
FIG. 5 is a schematic block diagram of a communication system 400 mounted on a first vehicle according to one embodiment.

FIG. 5 is a schematic block diagram of a communication system 400 mounted on a first vehicle according to one embodiment. Referring to FIG. 5, the communication system 400 includes a positioning device 401, a receiver 403, a transmitter 405, a processing device 407, a sound alert generator 409 and a memory device 411.

The positioning device 401 may be configured to obtain position information of the first vehicle, for example, geographical coordinates of the communication system 400. In some embodiments, the positioning device 401 may be a GPS device. The receiver 403 may be configured to receive frames from other vehicles and pedestrian devices. The transmitter 405 may be configured to broadcast frames.

The processing device 407 may be configured to: determine whether position information of a second vehicle which is close to the first vehicle is received from the second vehicle within a first predefined time period; add the position information of the first vehicle into a first 802.11 management frame; and control the transmitter 405 to broadcast the first 802.11 management frame. In some embodiments, the first time period may be 3 seconds.

In some embodiments, the processing device 407 may be further configured to: after position information of a first pedestrian device is received from the first pedestrian device by the receiver 403, define a second time period; determine whether position information of a second pedestrian device, which is close to the first pedestrian device, is received from a third vehicle in the second time period; add the received position information of the first pedestrian device into a second 802.11 management frame; and control the transmitter 405 to broadcast the second 802.11 management frame. In some embodiments, the second time period may be 3 seconds.

In some embodiments, the first or second 802.11 management frame may be a beacon frame, a probe response frame, an authentication response frame or an association response frame.

In some embodiments, the processing device 407 may be further configured to: calculate the distance between the first vehicle and one of the first and second pedestrian devices once the position information of the one of the first and second pedestrian devices is received by the receiver 401; compare the distance with a predetermined distance; and if the distance is shorter than the predetermined distance, control the sound alert generator 409 to generate an alarm to mention a user. In some embodiments, the predetermined distance may be ten meters.

In some embodiments, the receiver 403 and the transmitter 405 may be integrated in one device, such as a wireless Network Interface Card (NIC). The processing device 407 may be a CPU, or a MCU, or a DSP etc., or any combination thereof. The memory device 411 may store an operating system and program instructions.

Figure 6:
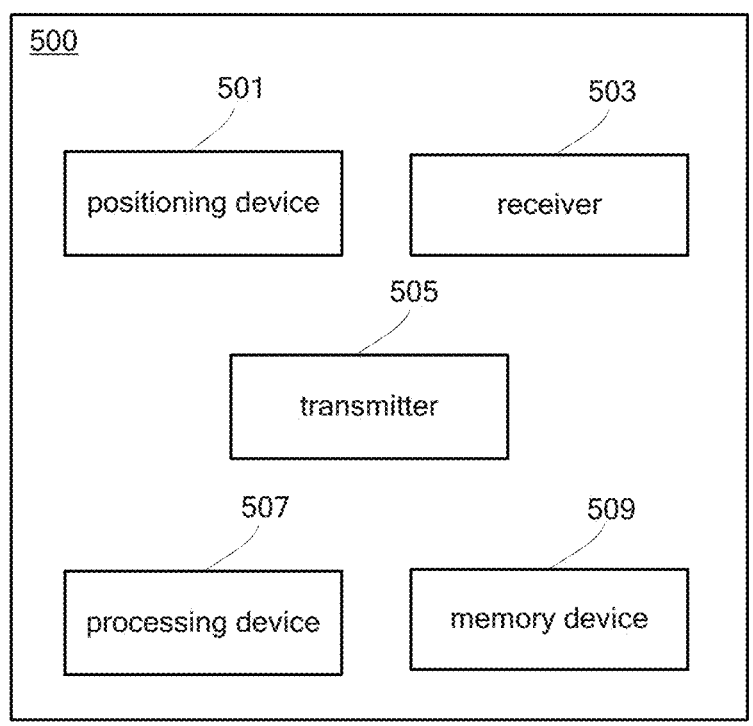
FIG. 6 is a schematic block diagram of a communication system 500 mounted on a third pedestrian device according to one embodiment.

FIG. 6 is a schematic block diagram of a communication system 500 mounted on a third pedestrian device according to one embodiment. Referring to FIG. 6, the communication system 500 mounted on the third pedestrian device may include a positioning device 501, a receiver 503, a transmitter 505, a processing device 507 and a memory device 509. In some embodiments, the third pedestrian device may be carried by a walker or a bicyclist.

The positioning device 501 may be configured to obtain position information of the third pedestrian device, for example, geographical coordinates of the communication system 500. In some embodiments, the positioning device 501 may be a GPS module. The receiver 503 may be configured to receive frames from vehicles. The transmitter 505 may be configured to broadcast frames.

The processing device 507 may be configured to: after position information of a fourth vehicle is received from the fourth vehicle by the receiver 503, define a third time period; determine whether position information of a fourth pedestrian device, which is close to the third pedestrian device, is received from a vehicle by the receiver 503 in the third time period; add the position information of the third pedestrian device into a third 802.11 management frame; and control the transmitter 505 to broadcast the third 802.11 management frame.

In some embodiments, the third 802.11 management frame may be a probe request frame, an authentication request frame or an association request frame.

In some embodiments, the receiver 503 and the transmitter 505 may be integrated in one device, such as a wireless NIC. The processing device 507 may be a CPU, or a MCU, or a DSP etc., or any combination thereof. The memory device 509 may store an operating system and program instructions.

According to one embodiment, a non-transitory computer readable medium, which contains a computer program for communicating position information, is provided. When the computer program is executed by a processor, it will instruct the processor to: determine whether position information of a first vehicle which is close to the processor is received within a predefined time period; and if no, broadcast its position information in a 802.11 management frame.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A Wi-Fi based position information communicating method, comprising:
   determining, with a communication device mounted on a first vehicle, whether position information of a second vehicle is received within a first predefined time period;
   if no position information of the second vehicle is received within the first predefined time period, broadcasting position information of the first vehicle in a first 802.11 management frames receiving position information of a first pedestrian device from the first pedestrian device;
   after receiving the position information of the first pedestrian device, defining a second time period;
   determining whether position information of a second pedestrian device is received from other vehicles in the second time period; and if no position information of the second pedestrian device is received from the other vehicles in the second time period, broadcasting the position information of the first pedestrian device in a second 802.11 management frame.

2. A Wi-Fi based position information communicating method, comprising:
   after receiving position information of a first pedestrian device from the first pedestrian device, broadcasting, with a communication device mounted on a first vehicle, the position information of the first pedestrian device in a first 802.11 management frames;
   after receiving the position information of the first pedestrian device from the first pedestrian device, defining a first time period;
   determining whether position information of a second pedestrian device is received from other vehicles in the first time period; and
   if no position information of the second pedestrian device is received from the other vehicles in the first time period, broadcasting the position information of the first pedestrian device in the first 802.11 management frame.

3. The method according to claim 2, further comprising:
   determining whether position information of a second vehicle, whose distance to the first vehicle is shorter than a second predetermined distance, is received within a second predefined time period; and
   if no position information of the second vehicle is received within the second predefined time period, broadcasting position information of the first vehicle in a second 802.11 management frame.

4. A communication system mounted on a first vehicle, comprising:
   a receiver;
   a transmitter; and
   a processing device configured to:
      determine whether position information of a second vehicle, whose distance to the first vehicle is shorter than a first predetermined distance, is received by the receiver within a first predefined time period;
      if no position information of the second vehicle is received within the first predefined time period, control the transmitter to broadcast position information of the first vehicle in a first 802.11 management frames;
      after position information of a first pedestrian device is received from the first pedestrian device by the receiver, define a second time period;
      determine whether position information of a second pedestrian device is received from other vehicles by the receiver in the second time period; and
      if the position information of the second pedestrian device is not received from the other vehicles by the receiver in the second time period, control the transmitter to broadcast the position information of the first pedestrian device in a second 802.11 management frame.

5. The method according to claim 1, wherein a distance from the second vehicle to the first vehicle is shorter than a predetermined distance.

6. The method according to claim 1, wherein the position information of the first pedestrian device is represented by Global Positioning System (GPS) coordinates.

7. The method according to claim 1, wherein the predefined time period is three seconds.

8. The method according to claim 1, wherein the first 802.11 management frame comprises a beacon frame, and wherein broadcasting the position information of the first vehicle in the first 802.11 management frame comprises adding the position information of the first vehicle into a first field of the beacon frame.

9. The method according to claim 8, wherein the beacon fame further comprises a second field, the second field including a sequence of bits representing a pedestrian detection application, and wherein the first vehicle identifies the first 802.11 management frame based on the sequence of bits representing the pedestrian detection application.

10. The method according to claim 8, wherein broadcasting the position information of the first vehicle in the first 802.11 management frame comprises adding an identifier of the first vehicle into the first 802.11 management frame.

11. The method according to claim 1, wherein the first 802.11 management frame comprises a probe response frame, an authentication response frame, or an association response frame.

12. The method according to claim 1, further comprising determining whether the position information of the first pedestrian device is received from the other vehicles in the second time period based on a transmitter ID contained in a frame which carries the position information of the first pedestrian device.

13. The method according to claim 1, wherein a distance from the first pedestrian device to the first vehicle is shorter than a predetermined distance.

14. The method according to claim 13, further comprising generating an alarm in the first vehicle responsive to determining that the distance from the first pedestrian device to the first vehicle is shorter than the predetermined distance.

15. The method according to claim 1, wherein the first pedestrian device is carried by a walker or a bicyclist.

* * * * *

UNITED STATES PATENT AND TRADEMARK OFFICE
CERTIFICATE OF CORRECTION

PATENT NO. : 10,257,770 B2
APPLICATION NO. : 15/300232
DATED : April 9, 2019
INVENTOR(S) : Zeng Yang et al.

Page 1 of 1

It is certified that error appears in the above-identified patent and that said Letters Patent is hereby corrected as shown below:

In the Claims

In Claim 1, Column 12, Lines 60-61, correct "management frames receiving position" to read "management frame;
receiving position".

In Claim 2, Column 13, Line 12, correct "management frames;" to read "management frame;".

In Claim 4, Column 13, Lines 45-46, correct "management frames;" to read "management frame;".

In Claim 9, Column 14, Line 23, correct "fame" to read "frame".

Signed and Sealed this
Twenty-eighth Day of May, 2019

Andrei Iancu
*Director of the United States Patent and Trademark Office*